United States Patent
Barthel

(10) Patent No.: US 9,139,444 B2
(45) Date of Patent: Sep. 22, 2015

(54) PYROGENIC SILICIC ACID MANUFACTURED IN A SMALL-SCALE PRODUCTION PLANT

(75) Inventor: Herbert Barthel, Mehring (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/139,190

(22) PCT Filed: Dec. 10, 2009

(86) PCT No.: PCT/EP2009/066800
§ 371 (c)(1),
(2), (4) Date: Jul. 7, 2011

(87) PCT Pub. No.: WO2010/066828
PCT Pub. Date: Jun. 17, 2010

(65) Prior Publication Data
US 2011/0256030 A1      Oct. 20, 2011

(30) Foreign Application Priority Data

Dec. 12, 2008   (DE) .......................... 10 2008 054 592

(51) Int. Cl.
*B01J 19/26* (2006.01)
*C01B 33/18* (2006.01)
*B01J 19/00* (2006.01)
*B01J 19/24* (2006.01)
*C01B 33/113* (2006.01)
*C01B 33/12* (2006.01)

(52) U.S. Cl.
CPC ............... *C01B 33/183* (2013.01); *B01J 19/26* (2013.01); *B01J 2219/00157* (2013.01); *B01J 2219/185* (2013.01); *B01J 2219/1946* (2013.01)

(58) Field of Classification Search
CPC ............ B01J 19/00; B01J 19/24; B01J 19/26; B01J 37/34; B01J 37/341; B01J 37/349
USPC .......... 422/129, 324, 325, 335–337; 423/324, 423/325, 335–337
See application file for complete search history.

(56) References Cited

U.S. PATENT DOCUMENTS

| | | | |
|---|---|---|---|
| 4,292,290 A | 9/1981 | Tunison, III | |
| 4,559,218 A | 12/1985 | Flemmert | |
| 5,682,929 A | 11/1997 | Maginot | |
| 5,686,054 A | 11/1997 | Barthel | |
| 6,063,354 A * | 5/2000 | Mangold et al. | 423/336 |
| 6,800,413 B2 | 10/2004 | Barthel | |

(Continued)

FOREIGN PATENT DOCUMENTS

| | | |
|---|---|---|
| DE | 4419234 | 12/1995 |
| DE | 10145162 | 4/2003 |

(Continued)

OTHER PUBLICATIONS

Ullmann's Encyclopedia of Industrial Chemistry, Wiley-VCH Verlag GmbH & Co. KGaA, 2002, Sauerstoff, pp. 61-68.

(Continued)

*Primary Examiner* — Natasha Young
(74) *Attorney, Agent, or Firm* — RatnerPrestia

(57) ABSTRACT

Disclosed is a flame reactor characterized in that the flame reactor comprises a reactor chamber having a volume of 1 $m^3$ to 10 $m^3$, is 1 m to 10 m high, and includes a reactor nozzle for feeding the reactants.

10 Claims, 1 Drawing Sheet

(56) References Cited

U.S. PATENT DOCUMENTS

| | | | |
|---|---|---|---|
| 8,142,753 B2 * | 3/2012 | Barthel et al. | ................ 423/337 |
| 8,257,674 B2 * | 9/2012 | Barthel et al. | ................ 423/335 |
| 2002/0032988 A1 | 3/2002 | Lange | |
| 2003/0138715 A1 | 7/2003 | Barthel | |
| 2008/0141904 A1 | 6/2008 | Barthel | |
| 2010/0025373 A1 | 2/2010 | Barthel et al. | |

FOREIGN PATENT DOCUMENTS

| | | |
|---|---|---|
| DE | 102006054156 | 5/2008 |
| DE | 102006054156 A1 | 5/2008 |
| EP | 0773159 | 9/1998 |
| EP | 1164115 | 12/2001 |
| JP | 57-11807 | 1/1982 |
| JP | 3-242342 A | 10/1991 |
| WO | 2006087136 | 8/2006 |
| WO | WO 2008/058894 * | 5/2008 |

OTHER PUBLICATIONS

International Search Report for PCT/EP2009/066800 filed Dec. 10, 2009, mailed May 18, 2010.

McGraw-Hill Dictionary of Scientific and Technical Terms ($5^{th}$ ed. 1994): "Construction that employs only straightedge and compasses or is carried out by drawing only straight lines and circles."

Introduction to Chemical Engineering Process Development (Zhongxian Zhang, pp. 26, 42, and 45, Capital Normal University Press, May 30, 2005).

* cited by examiner

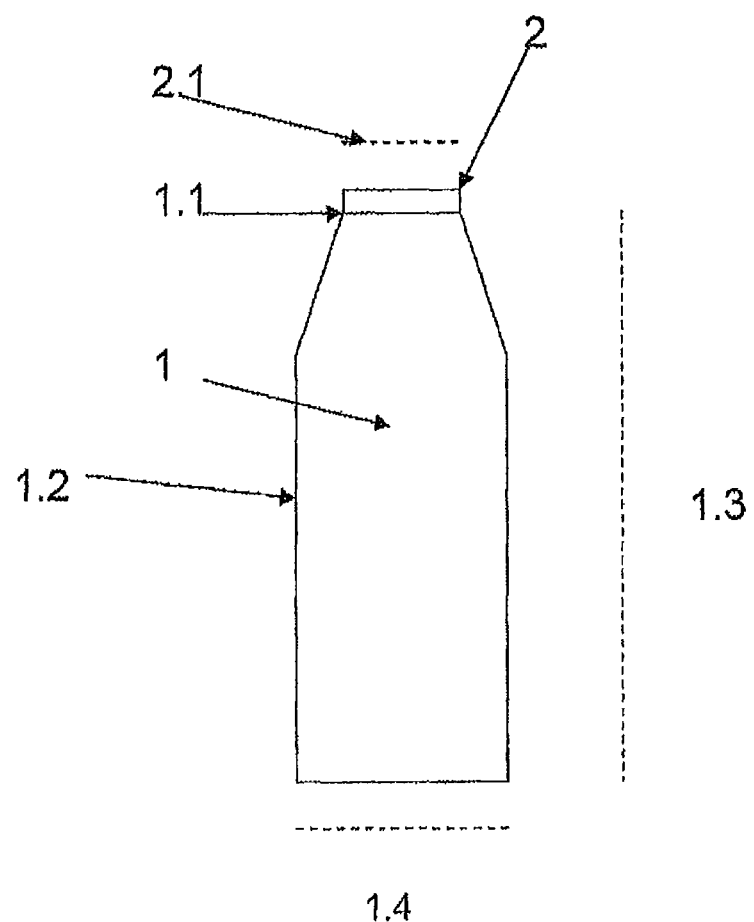

US 9,139,444 B2

PYROGENIC SILICIC ACID MANUFACTURED IN A SMALL-SCALE PRODUCTION PLANT

CROSS REFERENCE TO RELATED APPLICATIONS

This application is the national phase filing of international patent application No. PCT/EP2009/066800, now WO 2010/066828, filed 10 Dec. 2009, and claims priority of German patent application number 10 2008 054 592.9, filed 12 Dec. 2008, the entireties of which applications are incorporated herein by reference.

FIELD OF THE INVENTION

The invention provides a process and an apparatus for producing fumed silica.

BACKGROUND OF THE INVENTION

State of the Art

Pyrogenic metal oxides, for example fumed silica, are obtained by high-temperature hydrolysis of halosilicon compounds in a hydrogen-oxygen flame, as described, for example, in Ullmann's Encyclopedia of Industrial Chemistry (Wiley-VCH Verlag GmbH & Co. KGaA, 2002oxygen).

For many applications, not only the intrinsic quality but in particular also the purity of the silica is of high significance. This is true in particular of the use of the fumed silica in applications in the surface coating industry, in sealant applications, for example in silicone sealants and polyurethane sealants which crosslink at room temperature under the influence of moisture, and for use as a consumable in the manufacture of electronic semiconductor components, such as processors, memory, controllers and integrated components.

One example of a known problem is inadequate dispersibility of the fumed silica in silicone materials, such as silicone sealants, and in polyalkylene oxide-containing sealants such as polyurethanes.

Another problem which has often been described is that of defects as a result of scratches which occur when silica is used in chemomechanical polishing and planarizing applications on electronic components on semiconductor surfaces and wafers.

For the production of silica in a large production plant, there are restrictions in the achievement of the desired product quality.

SUMMARY OF THE INVENTION

It is an object of the invention to overcome the disadvantages of the prior art and more particularly to provide a process and an apparatus for producing fumed silica, and a fumed silica which has high quality.

The invention provides a flame reactor, characterized in that the flame reactor has a reactor chamber with a volume of 1 $m^3$ to 10 $m^3$, a height of 1 m to 10 m and a reactor nozzle for supply of the reactants.

BRIEF DESCRIPTION OF THE DRAWING

FIG. 1 shows an exemplary flame reactor according to the invention.

DETAILED DESCRIPTION OF THE INVENTION

The inventive apparatus for producing fumed silica comprises a reactor, a feed apparatus for the reaction gases, a mixing device for the reaction gases, a reactor nozzle, further feed apparatuses for supplying air.

The inventive apparatus for producing fumed silica preferably has the following units: (a) silane provision, silane evaporator, optionally gas mixing systems, optionally air processing, (b) reactor, (c) energy recovery and cooling, (d) optionally preliminary removal of the silica $SiO_2$ by preferably one cyclone, or a plurality thereof, (e) removal of the silica $SiO_2$ by preferably filters, preferably mesh filters, more preferably surface filters, (f) purification of the silica to remove last traces of hydrogen chloride HCl in a dryer, preferably a rotating drum dryer, preferably with internals which preferably achieve combined radial and vertical motion, or preferably in a fluidized bed, or a moving bed, preferably with supply of gases such as air or nitrogen or inert gas, preferably at temperatures greater than 100° C., more preferably greater than 300° C., most preferably greater than 500° C., with a superficial gas velocity of 0.1-100 cm/s, preferably 1-10 cm/s, and (g) preferably homogenizing, for example, by mixing and fluidization in a silo of a particular defined amount of silica to a homogeneous batch, for example 1-20 to, preferably 5-15 to, (h) storage in silos and (i) optional compaction, for example with roll compactors, screw compactors, piston compactors, preferably roll compactors, (j) transfer to containers, for example to 5-20 kg sacks, to big bags of 50-500 kg, or to large containers such as silo trucks, silotainers of capacity 500-5000 kg.

Preference is given to an apparatus for producing fumed silica which has, at least at one site other than the reactor nozzle in the reactor chamber, a feed apparatus for a combustion gas.

Preferably, the flame reactor has a height of 1 to 10 m, preferably 3 to 6 m, more preferably 4 to 5 m, and a length of the reaction space of 0.7 to 9 m, preferably of 2 to 5 m, more preferably of 3.5 to 4.5 m.

The flame reactor preferably has a cross-sectional area of 0.1 $m^2$ to 1 $m^2$, more preferably 0.2 $m^2$ to 0.9 $m^2$, more preferably of 0.35 $m^2$ to 0.75 $m^2$.

The flame reactor preferably has a volume of 1 $m^3$ to 10 $m^3$, more preferably 0.5 $m^3$ to 7 $m^3$, more preferably of 1.5 $m^3$ to 4 $m^3$.

The flame reactor preferably has a ratio of volume to height of 0.1 $m^2$ to 1 $m^2$, more preferably 0.2 $m^2$ to 0.9 $m^2$, more preferably of 0.35 $m^2$ to 0.75 $m^2$.

The direction of the flame may be horizontal or vertical or may assume any angle relative to the vertical. The direction of the flame may be from the bottom upward or from the top downward. The direction from the top downward is preferred.

In a preferred embodiment, the reactor chamber is open, and is in unrestricted exchange with the atmospheric pressure. This can mean that the reactor is outdoors or is in a hall open to the atmosphere.

The reactor chamber preferably has a diameter at the top of 0.1 to 1.0 m, more preferably 0.2 to 0.5 m. The reaction nozzle preferably has a circular cross section.

The reactor chamber preferably has a circular cross section.

The reactor chamber preferably has a diameter 1% wider, more preferably 10% wider, especially preferably 50% wider, than the diameter of the reactor chamber at the top of the reactor.

The reactor nozzle is preferably 0.05 to 0.25 m, more preferably 0.05 to 0.15 m, most preferably 0.1 to 0.15 m, in diameter.

The exit area of the reactor nozzle is preferably 0.001 $m^2$ to 0.1 $m^2$, more preferably 0.002 $m^2$ to 0.05 $m^2$, most preferably 0.0075 $m^2$ to 0.015 $m^2$, in size.

The invention further provides a process for producing fumed silica by reacting silicon-containing reaction gases in a flame in a reactor, characterized in that the content of organic nonsilicon compounds in the reaction gas is less than 5 mol %.

In the process according to the invention for producing fumed silica wherein, in a reactor, silicon-containing reaction gases are converted in an amount of preferably 10 to 500 kg/h, preferably 50 to 350 kg/h, more preferably 100 to 300 kg/h, of silicon dioxide, corresponding to 100 to 5000 tonnes per calendar year, preferably 250 to 4000 tonnes per calendar year, more preferably 500 to 3000 tonnes per calendar year, most preferably 500 to 1000 tonnes per calendar year. For this purpose, the reaction gases supplied comprise the following composition: vaporous or gaseous silicon compounds in an amount of preferably 1000 to 10 000 moles per hour, preferably 2000 to 8000 moles per hour, more preferably 3000 to 6000 moles per hour, or 100 to 2000 kg/h, preferably 20 to 1000 kg/h, more preferably 100 to 500 kg/h, where the nozzle exit gas velocity or gas velocity of the gases used at the reactor nozzle, based on standard volumes, is between 10 and 100 m/s, preferably between 20 and 80 m/s, more preferably between 40 and 70 m/s, and the gas velocity is distributed radially, preferably homogeneously, over the nozzle cross section, and is distributed radially, preferably homogeneously, over the reactor cross section, are reacted in a flame.

The capacity of a production plant in the process according to the invention is preferably less than 5000 tonnes, more preferably less than 4000 tonnes, even more preferably less than 3000 tonnes, especially preferably less than 1000 tonnes, of fumed silica, based on one calendar year. A calendar year shall be based on 7884 hours of production time, with availability at 85% of the time.

$$365\ d*24\ h/d*0.85=7884\ h$$

In a preferred embodiment, the fumed silica is produced in a single reactor with a capacity of less than 500 kg/h, more preferably less than 400 kg/h, especially preferably less than 250 kg/h, most preferably less than 100 kg/h.

The reaction gases are preferably oxygen, i.e., for example, air which may be fresh or dried, a combustion gas, for example hydrogen, a vaporous hydrocarbon (saturated or unsaturated, i.e. containing double and/or triple bonds), such as methane, ethane, isopropane, n-propane, isobutane, n-butane, ethene, ethyne, propene, isobutene and n-butene, and other higher iso- or n- or neoalkanes, -alkenes and -alkynes, lower alcohols such as methanol, ethanol, propanol, preference being given to methane, or mixtures thereof, preference being given to a combustion gas containing greater than 90% by volume of hydrogen, and preference being given as a second additional combustion gas containing greater than 1% by volume of natural gas, containing greater than 90% by volume of methane, and silane comprising at least one vaporous silicon-containing compound such as $R_xH_ySi_aX_zY_b$, where R is an alkyl radical having 1 to 8 carbon atoms, preferably a methyl radical, H is hydrogen, X is a halogen or an alkoxy group OR, preferably OCH3, Y is oxygen, and a is >0 and is an integer.

When a=1, b=0, and x+y+z=4;

preferred examples are: X is chlorine and x=1 or y=1 and z=3, more preferably X is chlorine and z=4.

When a=2, x+y+z=6 and b is 0 or 1.

a is preferably 1 to 5, more preferably 1.

In addition, further vapors or gases, preferably less than 10% by volume, which do not disrupt the reaction, such as $N_2$, Ar, He, $CO_2$, may be present.

The reaction gases are preferably premixed before the reaction.

For this purpose, preference is given to using continuous gas mixers, for example preferably static mixers.

The proportion of gaseous or vaporous or volatile silicon-containing compounds in the reaction gas which is supplied to the reaction is preferably 1 mol % to 20 mol %, more preferably 1 mol % to 10 mol %, especially preferably 4 mol % to 6 mol %.

The content of organic nonsilicon compounds in the reaction gas is preferably less than 5 mol %, more preferably less than 3 mol %, especially preferably less than 2 mol %, most preferably less than 1 mol %.

The content of inorganic nonsilicon compounds in the reaction gas is preferably less than 1% by weight, more preferably less than 10 ppm, especially preferably less than 500 ppb, most preferably less than 5 ppb.

The content of boron compounds in the reaction gases is preferably less than 100 ppm, more preferably less than 50 ppm, especially preferably less than 10 ppm, based on boron.

The content of germanium compounds in the reaction gases is preferably less than 100 ppm, more preferably less than 50 ppm, especially preferably less than 10 ppm, based on germanium.

The content of titanium compounds in the reaction gases is preferably less than 100 ppm, more preferably less than 50 ppm, especially preferably less than 10 ppm, based on titanium.

The content of iron compounds in the reaction gases is preferably less than 100 ppm, more preferably less than 50 ppm, especially preferably less than 10 ppm, based on iron.

The content of aluminum compounds in the reaction gases is preferably less than 100 ppm, more preferably less than 50 ppm, especially preferably less than 10 ppm, based on aluminum.

The content of tin compounds in the reaction gases is preferably less than 100 ppm, more preferably less than 50 ppm, especially preferably less than 10 ppm, based on tin.

The content of arsenic compounds in the reaction gases is preferably less than 100 ppm, more preferably less than 50 ppm, especially preferably less than 10 ppm, based on arsenic.

The content of sulfur compounds in the reaction gases is preferably less than 1000 ppm, more preferably less than 500 ppm, especially preferably less than 100 ppm, based on sulfur.

The content of phosphorus compounds in the reaction gases is preferably less than 1000 ppm, more preferably less than 500 ppm, especially preferably less than 100 ppm, based on phosphorus.

The proportion of oxygen in the reaction gas which is supplied to the reaction is preferably 10 mol % to 50 mol %, preferably 15 mol % to 30 mol %, more preferably 16 mol % to 21 mol %.

The proportion of combustion gas in the reaction gas which is supplied to the reaction is preferably 1 mol % to 25 mol %, more preferably 5 mol % to 15 mol %, especially preferably 4 mol % to 13 mol %, most preferably 5 mol % to 8 mol %.

The reaction gases comprising at least one preferably gaseous or vaporous silicon compound or a mixture of silicon compounds are introduced into the reactor chamber or flame in an amount of preferably 100 to 5000 m³ (STP)/h, more preferably 500 to 4000 m³ (STP)/h, especially preferably 1000-3000 m³ (STP)/h.

The reaction gases preferably contain hydrogen as a combustion gas, preferably in amounts of 4 to 15 mol %, preferably 4-10 mol %.

Preferably, in the reactor chamber, backflow of the reaction gases is below 50% by volume, more preferably below 10% by volume, even more preferably below 1% by volume, especially preferably below 0.1% by volume, of the overall gases. Exceptionally preferably, no measurable backflow occurs.

The gas exit velocity at the nozzle is preferably at a minimum.

The gas velocity in the reactor chamber is preferably at a minimum.

The reaction gases are preferably added in the form of vapor or in the form of gas.

The reaction gases are preferably premixed, preferably premixed homogeneously, before entry into the reactor.

The reaction gases are preferably premixed, especially premixed intensively, in the gas stream which is introduced into the reactor in the nozzle.

In a preferred embodiment, the hot process gases are quenched in the reactor by addition of hot, preferably slightly superheated, steam preferably diluted with air, preferably hot air, i.e. the reaction is moderated or stopped with water.

Examples of the silicon compounds are preferably silicon tetrachloride, hydrogen silicon trichloride, methyl silicon trichloride, and mixtures thereof. Preference is given, for reasons of economic viability and of quality, to mixtures which comprise silicon tetrachloride as the main constituent.

The silane preferably originates from processes which serve for preparation of amorphous, polycrystalline or monocrystalline silicon metal, for example silicon for the electronics industry or semiconductor industry or photovoltaic industry.

In a further preferred embodiment, the silane originates preferably from processes which serves for preparation of methyl chlorosilanes, for example as a raw material for preparation of silicones such as silicone oils, such as polydimethylsiloxanes, or silicone rubbers, such as crosslinked polydimethylsiloxanes, or silicone resins, for example for the construction industry, the coating materials industry or the automotive industry.

Owing to the preparation process therefor, the silicon compounds or mixtures thereof may comprise gaseous, vaporous or evaporable and volatile impurities, such as methane, ethane, isopropane, n-propane, isobutane, n-butane, ethene, ethyne, propene, isobutene and n-butene, and other higher iso- or n- or neoalkanes, -alkenes and -alkynes, lower alcohols such as methanol, ethanol, propanol, or mixtures thereof, or alkyl-substituted, optionally haloalkyl-substituted, such as chloroalkyl-substituted, gaseous, vaporous or evaporable organosilicon compounds, or hydrogen or nitrogen or argon or natural gas or carbon oxides, such as carbon monoxide or carbon dioxide.

In a preferred embodiment, this may be silicon tetrachloride from the disproportionation and conversion of hydrogen silicon trichloride at temperatures greater than 500° C., preferably greater than 700° C., more preferably greater than 850° C., to form silicon tetrachloride, silicon metal and hydrogen. The silicon tetrachloride can be removed and purified by distillation.

In an embodiment which is preferred for technical and economic reasons or else for reasons of product quality, the silicon-containing compound, or mixtures thereof, or the silane, has a content of greater than 10% by volume of silicon tetrachloride, more preferably greater than 90% by volume of silicon tetrachloride, even more preferably greater than 95% by volume of silicon tetrachloride, most preferably greater than 99% by volume of silicon tetrachloride, where the remaining proportion in the mixture may be hydrogen silicon trichloride and dihydrogen silicon dichloride.

In another embodiment which is preferred for economic reasons and may be based on the presence of large amounts of methyl silicon trichloride, methyl silicon trichloride is preferred, especially preferably in concentrations greater than 10 mol %.

In another embodiment which is preferred for economic reasons and may be based on the presence of large amounts of hydrogen silicon trichloride, hydrogen silicon trichloride is preferred.

In another embodiment which is preferred for economic reasons, mixtures of silicon tetrachloride and hydrogen silicon trichloride are preferred.

In another embodiment which is preferred for economic reasons, mixtures of silicon tetrachloride, methyl silicon trichloride and hydrogen silicon trichloride are preferred.

In a particularly preferred embodiment, mixtures which contain preferably less than or equal to 80 mol % of hydrogen silicon trichloride, even more preferably less than or equal to 20 mol % of hydrogen silicon trichloride, especially preferably less than 10 mol % of hydrogen silicon trichloride, are used.

In another preferred embodiment, mixtures which contain 30 mol % of hydrogen silicon trichloride are used.

In another particularly preferred embodiment, mixtures which contain more than 10 mol % of methyl silicon trichloride, even more preferably more than 20 mol % of methyl silicon trichloride, especially preferably more than 50 mol % of methyl silicon trichloride, are used.

In another preferred embodiment, mixtures containing greater than 40 mol % of methyl silicon trichloride, most preferably 45 mol % of methyl silicon trichloride, are used. These mixtures preferably then contain less than 20 mol %, preferably less than 10 mol %, more preferably less than 5 mol %, of carbon-containing silicon compounds other than methyl silicon trichloride, and less than 20 mol %, preferably less than 10 mol %, more preferably less than 5 mol %, of hydrogen-containing silicon compounds and less than 5 mol % of non-silicon-containing, optionally substituted hydrocarbons.

In another preferred embodiment, mixtures containing greater than 40 mol % of silicon tetrachloride, most preferably 45 mol % of silicon tetrachloride, are used. These mixtures then preferably contain less than 20 mol %, preferably less than 10 mol %, more preferably less than 5 mol %, of carbon-containing silicon compounds and less than 20 mol %, preferably less than 10 mol %, more preferably less than 5 mol %, of hydrogen-containing silicon compounds and less than 5 mol % of non-silicon-containing, optionally substituted hydrocarbons.

In a preferred embodiment of the invention, a gas mixture enters a burner chamber via a nozzle at the top of a combustion chamber at a gas velocity of 10 to 100 m/s, preferably 30-70 m/s, from a nozzle at a dosage rate of 500 to 5000 m$^3$ (STP)/h, preferably 750 to 3000 m$^3$ (STP)/h, more preferably 1000 to 2500 m$^3$ (STP)/h, and comprises preferably 0.1-100 mol %, more preferably 1-50 mol %, even more preferably 1-5 mol %, of tetrachlorosilane, 0-100 mol %, more preferably 1-5 mol %, of methyl trichlorosilane, 1-20 mol %, preferably 2.5-15 mol %, of hydrogen, 0.001 to 15 mol %, preferably 1-10 mol %, of carbon dioxide, 10-30 mol %, preferably 15-25 mol %, of oxygen, 50-100 mol %, preferably 65-75 mol %, of nitrogen, 0-50 mol %, more preferably 0.1-10 mol %, most preferably 0.5-5 mol %, of hydrogen methyl dichlorosilane, 0.001-100 mol %, more preferably 0.1-10 mol %, of hydrogen trichlorosilane, 0-50 mol %, more preferably 0.1-10 mol %, of tetramethylsilane, 0-50 mol %, more preferably 0.1-10 mol %, of trimethylchlorosilane and 0-20 mol %, more preferably 0.5-10 mol %, of mixtures of alkane, alkene or haloalkyl, i.e., for example, mixtures of propanes, butanes and pentanes, of propenes, butenes and pentenes, and of chloropropanes, chlorobutanes and chloropentanes, said combustion chamber having a volume of 1-10 m$^3$, more preferably 2.5-5 m$^3$, and a ratio of volume to height of 0.1-1 m$^2$, more preferably 0.25-0.75 m$^2$, and a cross-sectional area of 0.1-1 m$^2$, more preferably 0.25-0.75 m$^2$, and is reacted in the combustion chamber at 1000° C. to 2000° C.

Preferably, the oxygen for use in the reactor is taken from the air from the surrounding atmosphere. This means that air is preferably supplied to the reactor. The oxygen, O$_2$, in the air can be enriched to greater than 20% by volume, for example by adding pure oxygen, O$_2$, or by adding air which contains greater than 20% by volume of oxygen, O$_2$.

The air can be used as such, or can be predried by condensation and/or absorption of the water at less than 0° C., preferably at temperatures of less than –10° C., more preferably at temperatures of less than –20° C.

In a preferred embodiment of the process for producing fumed silica, a further reactor nozzle which surrounds, in an annular manner, the reactor nozzle from which the reaction gases emerge is used to additionally supply pure oxygen or air or air-oxygen mixtures or additionally supply pure nitrogen or air or air-nitrogen mixtures.

In a preferred embodiment of the process for producing fumed silica, further air can be introduced into the combustion chamber outside the nozzle at the top of the combustion chamber.

The reactor chamber is preferably open, and is in unrestricted exchange with the atmospheric pressure.

In a preferred embodiment, the hydrogen chloride, HCl, formed in the reaction is recovered by absorption and desorption, is purified and dried and reused.

In a further preferred embodiment, the dry hydrogen chloride, HCl, thus obtained is used to prepare chlorosilanes such as preferably silicon tetrachloride, hydrogen silicon trichloride, dihydrogen silicon dichloride and trihydrogen silicon chloride, especially preferably hydrogen silicon trichloride, from silicon metal.

Examples of a preferred use are a reaction and production of methyl chlorosilanes according to a generally simplified empirical formula

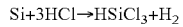
Si+3HCl→HSiCl$_3$+H$_2$ which can form reaction by-products such as silicon tetrachloride, hydrogen silicon trichloride and others, or a reaction and production of methyl chlorosilanes according to a generally simplified empirical formula HCl+CH$_3$OH→CH$_3$Cl+H$_2$O and, after separation of methyl chloride and water, optionally dried methyl chloride is used for reaction with metallic silicon, optionally with addition of catalysts and promoters, for example copper compounds or tin compounds,

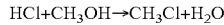
Si+2CH$_3$Cl→(CH$_3$)$_2$SiCl$_2$ which can form reaction by-products, such as methyl silicon trichloride, CH$_3$SiCl$_3$, trimethyl silicon chloride, (CH$_3$)$_3$SiCl and others.

Examples of inventive chemical reactions for the inventive production of the inventive fumed silica are the oxidation of the combustion gas with atmospheric oxygen, in which temperatures of from 1000 to 2000° C. are achieved in the reaction zone, and high-temperature hydrolysis by the water formed when a=1 and X=Cl and z=4, or oxidation of the silane and high-temperature hydrolysis for other values of a, b, x, y and z of the Si—X bonds by the water formed.

Preferred examples of the reactions are:
Formation of Water

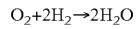
O$_2$+2H$_2$→2H$_2$O

High-Temperature Hydrolysis

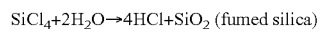
SiCl$_4$+2H$_2$O→4HCl+SiO$_2$ (fumed silica)

Oxidation and High-Temperature Hydrolysis

HSiCl$_3$+O$_2$+H$_2$→3HCl+SiO$_2$ (fumed silica)

Oxidation, Formation of Carbon Dioxide and High-Temperature Hydrolysis

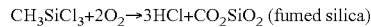
CH$_3$SiCl$_3$+2O$_2$→3HCl+CO$_2$SiO$_2$ (fumed silica)

In a preferred embodiment, the size of the reaction zone can be varied by varying the amount of the combustion gases.

In a further preferred embodiment of the invention, the reaction mixture is conducted out of the combustion chamber, preferably sucked out, preferably in the region of the lower end of the combustion chamber, then the reaction mixture is preferably cooled, more preferably with recovery of energy, preferably to temperatures of less than 300° C., most preferably less than 200° C., then the gas which contains the majority of the hydrogen chloride gas formed is preferably removed from the fumed silica formed, more preferably removed by the use of mesh filters, and a further parallel process is performed, preferably a recovery of dry hydrogen chloride gas, more preferably in a multistage absorption and desorption process, and, for environmental reasons, thereafter a reduction of the excess chlorine gas Cl$_2$ formed and, likewise for environmental reasons, further offgas cleaning to remove Cl$_2$ and HCl are performed.

In a further embodiment of the invention, preference is given to performing purification of the fumed silica produced in accordance with the invention by blowing gases through, preferably in a fluidized bed, preferably at temperatures of 400 to 800° C., more preferably of 500 to 700° C.

Preference is given to a process in which a fumed silica is obtained in accordance with the invention in an amount of 10-1000 kg/h, according to the invention 100-10 000 tonnes per year, at an annual output of 7884 hours, i.e. with availability at 85% of the time, with a specific BET surface area of 100 to 300 m$^2$/g, a tapped density after bagging in a 10 kg paper sack of 30 to 90 g/l, with a pH of a 4% by weight aqueous dispersion of 3.6 to 4.6, a Mocker screen residue larger than 40 μm of 0-0.01% by weight, a thickening action η/η0 in a silicone oil of 1-10, a thickening action η/η0 in an uncrosslinked unsaturated polyester resin of 1-10, a mean sphere-equivalent hydrodynamic particle size of 100-500 nm after ultrasound dispersion at 0.3% by weight, a temperature of 25° C. and a pH approx. 9.5-10.5, and measured with a Malvern Zetasizer Nano ZS® at a backscatter angle of 173°.

Preference is given to additionally performing continued combustion of residual oxygen and chlorine gas, by adding a combustion gas to the flame at least one site other than the reactor nozzle in the reactor chamber. Preferably, further combustion gas, for example hydrogen, can be added to the reaction zone at different points in the reactor chamber. This additional hydrogen is preferably used to reduce chlorine, Cl$_2$, formed in the reactor to HCl.

In another preferred embodiment, continued combustion of residual oxygen and chlorine gas is additionally performed, by adding a combustion gas below a temperature as the flame temperature at least one site other than the reactor chamber.

This additional hydrogen is preferably used to reduce chlorine, $Cl_2$, formed in the reactor to HCl.

Preference is given to a production process for silica in which the chlorine loss is preferably less than 10% by weight, more preferably less than 5% by weight, even more preferably less than 1% by weight.

This additionally added hydrogen may preferably contain nitrogen, preferably 0.001 to 90% by volume, more preferably 30-70% by volume.

In another preferred embodiment, the hydrogen does not contain any nitrogen, $N_2$.

Preferably, hydrogen is supplied the reactor as combustion gas.

Preferably, only hydrogen and no further combustion gas is used. This preferably prevents the formation of carbon oxides, such as carbon monoxide, CO, and the formation of chlorinated aromatic hydrocarbons, for example chlorinated dibenzodioxins.

In one possible embodiment, this hydrogen is from the catalytic thermal conversion of, for example, methanol to carbon dioxide, $CO_2$, and hydrogen.

In a further preferred possible embodiment, this hydrogen is from the catalytic thermal conversion of hydrocarbons and water to carbon dioxide, $CO_2$, and hydrogen. Carbon dioxide, $CO_2$, can be removed absorptively and adsorptively; the hydrogen can thus be purified.

In another preferred embodiment, this hydrogen is from the disproportionation and reaction of hydrogen silicon trichloride at temperatures greater than 500° C., preferably greater than 700° C., more preferably greater than 850° C., to form preferably silicon tetrachloride, silicon metal and hydrogen.

The hydrogen can also preferably be purified by low-temperature condensation of other constituents.

In another preferred embodiment, hydrogen which forms in the reaction of silicon metal with hydrogen chloride, HCl, to form hydrogen silicon trichloride is used.

The process for producing fumed silica preferably comprises the following, preferably successive steps: (1) silane provision, silane evaporator, optionally air processing, (2) reactor, (3) energy recovery and cooling, (4) optionally preliminary removal of the silica $SiO_2$ by preferably one cyclone, or a plurality thereof, removal of the silica $SiO_2$ by preferably filters, preferably mesh filters, more preferably surface filters, (5) purification of the silica to remove preferably the last traces of hydrogen chloride HCl in a dryer, preferably in a rotating drum dryer, preferably with internals which preferably achieve combined radial and vertical motion, or preferably in a fluidized bed or a moving bed, preferably with supply of gases such as air or nitrogen or inert gas, preferably at temperatures greater than 100° C., more preferably greater than 300° C., most preferably greater than 400° C., with a superficial gas velocity of 0.1-100 cm/s, more preferably 1-10 cm/s, preference being given to measuring the traces of hydrogen chloride, HCl, analytically by a measurement of the pH, for example by suspending 4 g of silica in 100 ml of water, and (6) preferably homogenization, for example by mixing and fluidization in a silo of a particular defined amount of silica to give a homogeneous batch, e.g. 1-20 to, preferably 5-15 to, (7) storage in silos and (8) optional compaction, for example with roll compactors, screw compactors, piston compactors, preferably roll compactors, (9) transfer to containers, for example to 5-20 kg sacks, sacks consisting preferably of multilayer paper, optionally coated with one or more layers, preferably polyethylene-coated, preferably perforated with small holes, or to big bags of 50-500 kg, preferably made of polyethylene or polypropylene, preferably 2-ply or multi-ply, for example as described in EP773159B1, or to large containers such as silo trucks, silotainers, preferably silotainers which contain an internal container or internal sack or inliner for protection of the silica from impurities, for example made of polyethylene or polypropylene, of capacity 500-5000 kg.

The generation of the gas temperature in a fluidized bed, or a moving bed, for purifying the fumed silica, for example to remove hydrogen chloride, HCl, preferably with supply of gases such as air or nitrogen or inert gas, for purifying the silica to remove HCl, can be effected by electrical heating of the gas or, for reasons of economic viability and of protection of energy resources, by burning a combustion gas such as hydrogen, methane, ethane, propane, butane with air or oxygenous gas; preference is given to using hydrogen for this purpose.

In a preferred embodiment, no additional water is added in the overall process, apart from the water which forms through the reaction of the reaction gases.

In another preferred embodiment, before, preferably during, or after the purification of the fumed silica, preferably to improve the desorption of HCl from the silica, steam is additionally added.

In another preferred embodiment, steam is added to standardize and eliminate residual reactivity from the silica surface to stabilize the silica; this can simultaneously achieve conditioning of the silica surface, preferably toward reaction with atmospheric humidity.

Processes for Densification

In a further preferred embodiment, the silica can be densified by moistening with a liquid and subsequent drying.

Moistening can be effected by stirring or dispersing into a liquid.

In a further particularly preferred embodiment, the moistening can be performed by spraying, which means that the silica is densified by spraying with liquid and then drying.

Preference is given to using fumed silica.

The fumed silica can be used either in the form of hydrophilic silica or in the form of silica which has been silylated with organosilicon compounds.

Preference is given to using hydrophilic silica.

The silica preferably has, before the densification, a tapped density to DIN of 20 to 120 g/l, more preferably 25 to 45 g/l.

The silica preferably has, after the densification, a tapped density to DIN of 60 to 300 g/l, more preferably 70 to 150 g/l.

Spraying with liquids is effected by the aerosol technique described in DE 4419234.

The silica is dried preferably by drying techniques as described in DE 4419234, U.S. Pat. No. 5,686,054 or DE 10145162, U.S. Pat. No. 6,800,413.

Preferred liquids for densification of silica are low-viscosity and low-volatility siloxanes, such as hexamethyldisiloxane, are low-viscosity and low-volatility hydrocarbons, such as n-hexane or toluene, are low-viscosity and low-volatility alkyl alcohols such as methanol, ethanol or isopropanol, including those which have been denatured by additives, are ketones such as acetone, or ethers such as tetrahydrofuran, or are protic solvents such as water, and mixtures thereof.

Preferred liquids are those with a high dielectric constant, more preferably with a dielectric constant of greater than 20.

Preferred liquids are those with a high density, more preferably with a density of greater than 0.9 g/cm$^3$.

Preferred liquids are those with a high surface tension, more preferably with a surface tension of greater than 40 mN/m.

Fumed silica produced in accordance with the invention which has a specific surface area of preferably 30 to 500 m$^2$/g, more preferably 70 to 330 m$^2$/g, even more preferably 80 to 230 m$^2$/g, especially preferably 130 to 170 m$^2$/g, preferably measured according to BET, and a mean aggregate particle size, preferably measured as the sphere-equivalent hydrodynamic diameter, of preferably 50 to 500 nm, more preferably 120 to 350 nm, especially preferably of 130 to 200 nm, and a relative thickening action in liquids $\eta/\eta 0$ of preferably greater than 2.0, more preferably greater than 4.0, especially preferably greater than 6.0, most preferably greater than 7.5, and a proportion of less than 0.03% by weight, preferably less than 0.015% by weight, more preferably less than 0.008% by weight, of coarse particles, preferably coarse particles of diameter greater than 10 μm, more preferably greater than 40 μm, based on the fumed silica, and less than 100 000 coarse particles, preferably less than 20 000 coarse particles, more preferably less than 10 000 coarse particles, even more preferably less than 5000 coarse particles, especially preferably less than 1000 coarse particles, larger than 10 μm, more preferably larger than 2 μm, per 1 milliliter (ml or cm$^3$) in an aqueous suspension containing 1 gram of silica.

The invention further provides a fumed silica which has a thickening action, described as the relative thickening $\eta/\eta 0$ in a silicone oil with optimal dispersion, of preferably greater than 2.0, a mean sphere-equivalent hydrodynamic diameter in water at pH greater than 9 of 150 to 300 nanometers, a boron content of less than 1 ppm, a titanium content of less than 1 ppm, an iron content of less than 1 ppm, an aluminum content of less than 10 ppm, a nickel content of less than 1 ppm, a copper content of less than 1 ppm, and a germanium content of less than 1 ppm.

The silica which is produced by the process according to the invention is a fumed silica which preferably has a specific surface area of 30 to 500 m$^2$/g, more preferably 70 to 330 m$^2$/g, even more preferably 80 to 230 m$^2$/g, especially preferably 80 to 170 m$^2$/g, preferably measured according to BET, and is a fumed silica which has a mean aggregate particle size, preferably measured as the sphere-equivalent hydrodynamic diameter, of 100 to 500 nm, preferably 150 to 350 nm, more preferably of 150 to 250 nm, preferably measured as described above, and is a fumed silica which has a relative thickening action in liquids $\eta/\eta 0$ of preferably greater than 2.0, more preferably greater than 4.0, especially preferably greater than 6.0, most preferably greater than 7.5, preferably measured as described above, and is a fumed silica which contains a proportion of less than 0.03% by weight, preferably less than 0.015% by weight, more preferably less than 0.005% by weight, of coarse particles, preferably coarse particles larger than diameter 10 μm, more preferably larger than 40 μm, based on the fumed silica, and is a fumed silica which contains less than 100 000 coarse particles, preferably less than 20 000 coarse particles, more preferably less than 10 000 coarse particles, even more preferably less than 5000 coarse particles, especially preferably less than 1000 coarse particles, larger than 10 μm, more preferably larger than 1.5 μm, even more preferably larger than 1.0 μm, especially preferably larger than 0.56 μm, per 1 milliliter (ml or cm$^3$), preferably based on a 1 to 50% by weight, more preferably on a 10% by weight, aqueous dispersion of the silica.

In addition, the fumed silica produced in accordance with the invention preferably has a proportion of coarse sintered particles of preferably less than 0.05% by weight, more preferably less than 0.03% by weight, especially preferably less than 0.015% by weight, most preferably less than 0.008% by weight. One example of a suitable test method is a gravimetric determination of the screen residue, for example according to Mocker (oversize >40 μm).

The fumed silica produced in accordance with the invention preferably contains less than 0.05% by weight, more preferably less than 0.03% by weight, even more preferably less than 0.015% by weight, most preferably less than 0.008% by weight, of coarse sintered particles having a density of 200 to 2500 g/l and having a diameter of 0.5 to 500 μm. An example of a suitable test method is the use of the optical centrifuge, for example the LUMifuge® instrument.

Fumed silica produced in accordance with the invention, and aqueous dispersion produced therefrom, or chemical formulation based on such a dispersion, in which, after optimal dispersion, for example with an ultrasound tip or ultrasound transducer or ultrasound homogenizer, for preferably greater than 1 minute, more preferably 2 to 5 minutes, and optimal stabilization, preferably alkaline stabilization at pH 9-11, preferably pH 9.9 to 10.2, and in which, after removal of the fine fumed silica, non-silica particles and coarse silica particles, such as coarse and/or dense sintered particles having a density of 200 to 2500 g/l and having a diameter of 0.5 to 500 μm, by commercial counting processes for determination of large particles, for example based on light extinction processes, for example of white light or of laser light, preferably less than 10 000 particles, more preferably less than 2000 particles, especially preferably less than 1000 particles, even more preferably less than 500 particles, exceptionally preferably less than 100 particles, larger than 10 μm, more preferably larger than 1.5 μm, even more preferably larger than 1.0 μm, especially preferably larger than 0.56 μm, per ml are present, after subtraction of the blank value for particles of the water used for preparation of the dispersion.

Preferably, the fumed silica contains agglomerates and flakes having a density of 10 to 200 g/l and having a diameter of 1 to 500 μm.

The size of the silica agglomerates can preferably be measured by Fraunhofer light diffraction on the silica in aqueous dispersion or as a dry aerosol or powder, or by screen methods. Suitable instruments are supplied, for example, by Malvern®, Sympatec®, Coulter®, Zilas® or Horiba®.

Preferably, the fumed silica has low contamination with non-silicon dioxide components.

The fumed silica preferably has a content of any non-silicon element of less than 1% by weight, preferably less than 0.1% by weight, more preferably less than 0.01% by weight, even more preferably less than 10 ppm by weight, especially preferably less than 1 ppm by weight, based on the overall silica.

In addition, the silica produced in accordance with the invention has an aluminum content less than 10 ppm by weight, preferably less than 1 ppm of aluminum, a boron content of less than 10 ppm by weight, preferably less than 1 ppm of boron, a titanium content of less than 1 ppm by weight, preferably less than 200 ppb of titanium, and iron, cobalt, nickel and copper contents less than 1 ppm by weight, preferably iron, cobalt, nickel and copper less than 200 ppb, based on the overall silica.

The silica produced preferably has a primary particle diameter d or Sauter diameter d, calculated from the specific surface area SO, measured according to BET, and the material density ρ of 2200 g/l, according to d=6/(ρ*SO), of 5-100 nm, a specific surface area measured according to BET of 30-500 m$^2$/g and a hydrodynamic diameter of the preferably stably sintered aggregates formed from primary particles of 100-500 nm, measured as described above or by dynamic light scattering or photocorrelation spectroscopy or inelastic light scattering, measured in suspension in a liquid with, in pure form, viscosity <5 mPas, such as an aqueous suspension in water or alcoholic suspension, or has an aerodynamic diameter of 100-1000 nm, measured in air or gas, or a diameter measured via rheology of greater than 100 nm, a geometric diameter of the agglomerates formed from aggregates, measured by Fraunhofer light diffraction, in fluids such as water or alcohol or oils, of 500 nm to 100 μm, and, measured in air or gases, of 1 μm to 1 mm.

The silica produced preferably has a fractal dimension of the surface area of less than 3, preferably 1.9 to 2.7, more preferably of 2.0 to 2.1.

The silica produced preferably has a fractal dimension of the mass of less than 3, preferably 1.5 to 2.8, more preferably of 1.8 to 2.3, especially preferably of 1.9 to 2.1.

The silica produced preferably has a content of surface silanol groups SiOH of 1.5-2.0, preferably of 1.7-1.9, SiOH per $nm^2$ of specific surface area measured according to BET, or measured as acidic SiOH by means of a titration method based on the method of Sears.

The silica preferably does not contain any chlorinated polyaromatic hydrocarbons, more particularly none which contain oxygen atoms.

More particularly, the content of chlorinated aromatic dioxins and furans is less than 1 ppb by weight.

Analysis of the Properties

Preferably, the relative thickening action $\eta/\eta 0$ of the fumed silica is measured as the quotient of the viscosity $\eta$ of a liquid medium which comprises fumed silica, measured at a temperature of 25° C., and of the viscosity $\eta 0$ of a liquid medium which contains no fumed silica, measured at a temperature of 25° C. Examples of liquid media are mixtures of a polyester resin, for example approx. 65% by weight, for example, of a condensation product of ortho-phthalic anhydride and maleic anhydride on the one hand, and of a diol, for example 1,2-propanediol, on the other hand, in a solvent, for example approx. 35% by weight, for example, of a reactive monomer, for example monostyrene, or, for example, silicone oils, for example preferably polydimethylsiloxane, preferably end-capped with trimethylsiloxy groups, preferably one with a viscosity at 25° C. of from 0.5 to 5.0 Pas, more preferably 0.9-2.1 Pas, even more preferably approx. 1.0 Pas. The amount of fumed silica in the liquid medium is preferably from 1 to 5% by weight, more preferably from 1.8 to 3.4% by weight, most preferably 2% by weight.

The viscosity is preferably measured at a temperature of 25° C. and at the same constant shear rate, preferably at a constant shear rate of from 0.5 to 200 l/s, more preferably at from 0.9 to 20 l/s, even more preferably at 10 l/s.

The fumed silica is dispersed in the liquid medium preferably with optimal dispersion, for example with a toothed disk dissolver at a peripheral speed of from 4 to 20 m/s, preferably at 11 m/s, preferably over an optimal period, more preferably over from 3 to 10 minutes, most preferably over 5 minutes.

The mean aggregate particle size is preferably measured as the mean sphere-equivalent hydrodynamic diameter, preferably measured by photocorrelation spectroscopy or dynamic light scattering or quasi-elastic light scattering, at an angle of from 1 to 179°, preferably at approx. 90°, or, in another preferred embodiment, in backscatter at an angle of from 170° to 179°, preferably at an angle of approx. 173°, for example with the Malvern Zetasizer® or Malvern Nanosizer® instrument, and, for example, readout of the Z-average value by a cumulant analysis or the standard algorithm, as the mean aggregate diameter and preferably after dispersion at 0.001 to 5% by weight, preferably approx. 0.3% by weight in preferably alkaline water, preferably of pH greater than 9, more preferably of approx. pH 10, preferably adjusted with ammonia, and preferably with dispersion with a magnetic stirrer, preferably at from 100 to 500 revolutions per minute, more preferably at 300 revolutions per minute, and with ultrasound, preferably an ultrasound tip at 75-95% power, more preferably at 90% power, for example a Bandelin UM60 ultrasound tip, over from 1 to 15 minutes, preferably from 5 to 10 minutes, more preferably 5 min., at a temperature of 25° C.

The proportion of coarse particles, for example sintered particles, is preferably determined gravimetrically. An example of a suitable test method here is a gravimetric determination of the screen residue after screening of the silica slurried with water with screens of mesh sizes less than or equal to 100 μm, preferably less than or equal to 40 μm, more preferably less than or equal to 10 μm. A particularly preferred example of this is the Mocker method, for example by means of a water jet, and screening off the coarse particles a 40 μm screen (after weighing, the oversize >40 μm is thus obtained gravimetrically).

The proportion of coarse particles is preferably determined as coarse sintered particles having a density of from 100 to 2500 g/l, preferably 200 to 2500 g/l, and having a diameter of from 0.5 to 500 μm, preferably 2 μm to 100 μm.

An example of a suitable analysis method is the use of an optical centrifuge, for example the LUMifuge® instrument.

Preferably, the proportion of coarse particles in the fumed silica produced by the process according to the invention is measured on an aqueous dispersion, or chemical formulation based on such a dispersion which has been produced from the silica by means of optimal dispersion, for example with an ultrasound tip, and a dispersion time of greater than 1 minute, preferably of 2.5 minutes, and optimal stabilization, for example alkaline stabilization at pH 9-11, preferably pH 9.2 to 10.2, by commercial counting methods for determining large particles, for example based on light extinction processes or light scattering processes, for example of white light or of laser light, for example with an Accusizer® 680 or 780 instrument, or a Liquilaz® instrument from PSM, Oreg., USA, or an FAS® 815 instrument from Topas, Germany.

The quality of the silica product is preferably checked at regular intervals by sampling and analysis of these samples with methods typical for silica, such as the specific surface area, for example measured according to BET, or, for example, measured by acid-base titration, for example as described in Sears et al., such as the particle size, for example the mean aggregate diameter, for example as the hydrodynamic diameter, for example measured by dynamic light scattering, or methods specified hereinafter, such as the pH, for example measured as the pH of a dispersion of 4% by weight of silica in water, such as the screen residue on coarse constituents, for example measured by the method according to Mocker by means of a water jet and a 40 μm screen, or as counting methods for analysis of coarse particles, for example with white light or laser light extinction and counting methods, as described above, such as the thickening action in liquid media, for example as described above, preferably according to defined protocols.

The sample is preferably taken with a specific sampling device.

The traces of HCl are preferably measured analytically by a measurement of the pH, for example by suspending 4 g of silica in 100 ml of water.

Preferably, the fumed silica exhibits low contamination with non-silicon dioxide constituents.

This can be assessed visually by an assessment of the screen residue according to Mocker (>40 μm), preferably with a magnifying glass, more preferably with a light microscope, which makes darkness, whiteness and colors visible down to >10 µm, preferably down to >1 µm, or, for example, by scanning electron microscopy or transmission electron microscopy, or by suspending silica in carbon tetrachloride, in which fumed silica or fumed silica dispersions appear to be transparent owing to the equal refractive index, thus making non-silicon dioxide fractions more clearly visible, for example making them visible even to the naked eye, but preferably with a magnifying glass or with a light microscope.

Non-silicon elements are preferably detected qualitatively and semiquantitatively by means of spectral analysis after fuming silicon dioxide with hydrofluoric acid, or analyzed quantitatively by means of inductively coupled plasma and optical emission analysis or mass spectrometry.

The inventive fumed silica produced by the process according to the invention is preferably used as a thickener, rheology additive, thixotropic agent, reinforcing filler for elastomers, plastomers and thermosets, for example in surface coatings, paints and inks, adhesives, sealants, glass fiber-reinforced plastics, composite materials, rubbers and other plastics, as abrasive particles in chemomechanical planarization in the semiconductor industry, as a polish, as a thermal insulator and as a raw material for thermal insulators, for producing print media, as a flow aid, for producing layers and moldings which may be impervious or porous, as an additive and filler for paints, coatings, inks, adhesives and sealants and rubbers, composed of silicones or synthetic or natural rubber, for example for tires and shoe soles.

The inventive fumed silica produced by the process according to the invention is used as a matting agent in paints and coatings, and for adhesive and sealant systems.

At the same time, it has been found that, surprisingly, these inventive plants can achieve finer and more readily dispersible three-dimensional structures of the fumed silica particles, i.e. finer aggregates of the silica arise, and thus an improvement in the property as a rheological additive, as a reinforcing filler for elastomers, plastomers and resins, as a thermal insulation base material, as a coating material for print media is achieved.

The silica is preferably used as a rheological additive and as a filler in sealants in amounts of 5 to 15%, preferably as a sealant for joins in the sanitary and kitchen sector, in window and façade construction, in construction and civil engineering, and in machines and in tool manufacture.

The silica is preferably used in the process of chemomechanical polishing in optics, in the semiconductor industry, in the electrical engineering and in the electronics industry, and in the surface treatment of metals, ceramics and glasses, as an abrasive or polish.

The invention further provides a molding, coating or impregnation which comprises the inventive silica.

The silica is preferably used in coating materials, surface layers, textiles, polymeric adhesives, sealants, rubbers and composite materials, and in coating materials, adhesives, sealants, rubbers and composite materials to control the rheology or the mechanical properties, or to control rheology and reinforcement.

The invention further provides a powder or toner which comprises the inventive silica.

The silica is preferably used in powders, in toners, in electrophotography, in firefighting powders, and in toners in electrophotography, in firefighting powders to control the dry free flow or the electrical charge, or to control the dry free flow and the electrical charge.

FIG. 1

FIG. 1 shows an inventive flame reactor with direction of the flame from the top downward, in longitudinal section, where 1 means the reactor chamber and 1.1 the diameter at the top of the reactor, and 1.2 the diameter at half the reactor length. 1.3 means the height, which is equal to the length of the reactor chamber, and 1.4 means the diameter of the reactor chamber. 2 denotes the nozzle and 2.1 the diameter of the nozzle.

EXAMPLES

Example 1

A gas mixture which enters a burner chamber via a nozzle at the top of a combustion chamber from a nozzle with a gas velocity of 58 m/s, the combustion chamber having a length of 4650 mm and a cross-sectional area of 0.71 m$^2$, and no gauge pressure compared to the current outside pressure, and the gas mixture having a temperature between 100° C. and 200° C., and the reaction zone having a length of 3875 mm, and the gas mixture being introduced into the combustion chamber at 2085 m$^3$ (STP)/h, and the gas mixture comprising 0.049 mol % of methyl trichlorosilane, 0.019 mol % of hydrogen, 0.17 mol % of oxygen and 0.70 mol % of nitrogen, is reacted on entry into the combustion chamber at 1000° C. to 2000° C. After sucking the product out of the combustion chamber, cooling to less than 200° C., removing the hydrogen chloride gas formed from the fumed silica formed through mesh filters, recovering dry hydrogen chloride gas in a multistage absorption and desorption process, reducing the excess chlorine gas and cleaning the offgas, and cleaning the fumed silica to remove residual hydrogen chloride and other volatile compounds in a fluidized bed by means of hot gases at 400 to 800° C., a fumed silica is obtained with a specific BET surface area of 150 m$^2$/g, with a tapped density after bagging in a 10 kg paper sack of 43 g/l, with a pH of a 4% by weight aqueous dispersion of 4.2, a screen residue according to Mocker larger than 40 µm of 0.003% by weight, a thickening action $\eta/\eta 0$ in a silicone oil of 3.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 2

A premixed gas mixture which enters a burner chamber via a nozzle at the top of a combustion chamber from a nozzle with a gas velocity of 73 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 6% by volume of silane with a methyl trichlorosilane content of greater than 90% by volume, 88% by volume of air from the environment, the air being fed in to an extent of 94% by volume from the nozzle and to an extent of 6% by volume from further feed devices outside the nozzle at the top of the combustion chamber, and 5% by volume of combustion gas, the combustion gas containing greater than 90% by volume of hydrogen gas. After sucking the product out of the combustion chamber, cooling to less than 200° C., removing the hydrogen chloride gas formed from the fumed silica formed through mesh filters, recovering dry hydrogen chloride gas in a multistage absorption and desorption process, reducing the excess chlorine gas, and cleaning the offgas, and purification of the fumed silica in a fluidized bed by means of hot gases at from 400 to 800° C., a fumed silica is obtained with a specific BET surface area of 150 m²/g, with a tapped density after bagging in a 10 kg paper sack of 40 g/l, with a pH of a 4% by weight dispersion of 4.1, a >40 μm screen residue according to Mocker of 0.005% by weight, a thickening action η/η0 in a silicone oil of 4.0, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 3

A gas mixture which enters a burner chamber via a nozzle at the top of a combustion chamber from a nozzle with a gas velocity of 34 m/s at a dosage rate of 1630 m³ (STP)/h, which contains 4.9 mol % of methyl trichlorosilane, 5.8 of hydrogen, 1.9 mol % of carbon dioxide, 17 of oxygen and 70 of nitrogen as gases, said combustion chamber having a volume of 1.7 m³, and a ratio of volume to height of 0.38 m² and a cross-sectional area of 0.38 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 217 kg/h, corresponding to 1920 tonnes per year with an annual output of 8864 hours, with a specific BET surface area of 150 m²/g, with a tapped density after bagging in a 10 kg paper sack of 40 g/l, with a pH of a 4% by weight aqueous dispersion of 4.1, a screen residue according to Mocker larger than 40 μm of 0.005% by weight, a thickening action η/η0 in a silicone oil of 6.5, a thickening action η/η0 in an uncrosslinked unsaturated polyester resin of 4.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 4

A gas mixture which enters a burner chamber via a nozzle at the top of a combustion chamber from a nozzle with a gas velocity of 34 m/s at a dosage rate of 1630 m³ (STP)/h, which contains 4.9 mol % of methyl trichlorosilane, 5.8 mol % of hydrogen, 17 mol % of oxygen and 71.9 mol % of nitrogen as gases, said combustion chamber having a volume of 1.7 m³, and a ratio of volume to height of 0.38 m² and a cross-sectional area of 0.38 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 217 kg/h, corresponding to 1920 tonnes per year with an annual output of 8864 hours, with a specific BET surface area of 150 m²/g, with a tapped density after bagging in a 10 kg paper sack of 40 g/l, with a pH of a 4% by weight aqueous dispersion of 4.1, a screen residue according to Mocker larger than 40 μm of 0.005% by weight, a thickening action η/η0 in a silicone oil of 6.5, a thickening action η/η0 in a silicone oil of 6.5, a thickening action η/η0 in an uncrosslinked unsaturated polyester resin of 4.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 5

A gas mixture which enters a burner chamber via a nozzle at the top of a combustion chamber from a nozzle with a gas velocity of 34 m/s at a dosage rate of 1405 m³ (STP)/h, which contains 4.3 mol % of tetrachlorosilane, 12 mol % of hydrogen, 4 mol % of carbon dioxide, 16 mol % of oxygen and 64 mol % of nitrogen as gases, said combustion chamber having a volume of 1.7 m³, and a ratio of volume to height of 0.38 m² and a cross-sectional area of 0.38 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 161 kg/h, corresponding to 1420 tonnes per year with an annual output of 8864 hours, with a specific BET surface area of 150 m²/g, with a tapped density after bagging in a 10 kg paper sack of 40 g/l, with a pH of a 4% by weight aqueous dispersion of 4.1, a screen residue according to Mocker larger than 40 μm of 0.005% by weight, a thickening action η/η0 in a silicone oil of 6.5, a thickening action η/η0 in an uncrosslinked unsaturated polyester resin of 4.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 6

A gas mixture which enters a burner chamber via a nozzle at the top of a combustion chamber from a nozzle with a gas velocity of 34 m/s at a dosage rate of 1405 m³ (STP)/h, which contains 4.3 mol % of tetrachlorosilane, 12 mol % of hydrogen, 16 mol % of oxygen and 68 mol % of nitrogen as gases, said combustion chamber having a volume of 1.7 m³, and a ratio of volume to height of 0.38 m² and a cross-sectional area of 0.38 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 161 kg/h, corresponding to 1420 tonnes per year with an annual output of 8864 hours, with a specific BET surface area of 150 m²/g, with a tapped density after bagging in a 10 kg paper sack of 40 g/l, with a pH of a 4% by weight aqueous dispersion of 4.1, a screen residue according to Mocker larger than 40 μm of 0.005% by weight, a thickening action η/η0 in a silicone oil of 6.5, a thickening action η/η0 in an uncrosslinked unsaturated polyester resin of 4.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 7

A gas mixture which enters a burner chamber via a nozzle at the top of a combustion chamber from a nozzle with a gas velocity of 54 m/s at a dosage rate of 2600 m³ (STP)/h, which contains 4.6 mol % of methyl trichlorosilane, 7.6 mol % of hydrogen, 2.5 mol % of carbon dioxide, 17 mol % of oxygen and 68 mol % of nitrogen as gases, said combustion chamber having a volume of 3.3 m³, and a ratio of volume to height of 0.71 m² and a cross-sectional area of 0.71 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 321 kg/h, corresponding to 2850 tonnes per year with an annual output of 8864 hours, with a specific BET surface area of 200 m²/g, with a tapped density after bagging in a 10 kg paper sack of 40 g/l, with a pH of a 4% by weight aqueous dispersion of 4.0, a screen residue according to Mocker larger than 40 μm of 0.005% by weight, a thickening action $\eta/\eta 0$ in a silicone oil of 7.5, a thickening action $\eta/\eta 0$ in an uncrosslinked unsaturated polyester resin of 6.7, a mean sphere-equivalent hydrodynamic particle size of 200 nm after ultrasound dispersion at 0.3% by weight, a temperature of 25° C. and at pH 10, and measured with a Malvern Zetasizer Nano ZS® at a backscatter angle of 173°.

Example 8

A gas mixture which enters a burner chamber via a nozzle at the top of a combustion chamber from a nozzle with a gas velocity of 54 m/s at a dosage rate of 2600 m³ (STP)/h, which contains 4.6 mol % of methyl trichlorosilane, 7.6 mol % of hydrogen, 17 mol % of oxygen and 70.5 mol % of nitrogen as gases, said combustion chamber having a volume of 3.3 m³, and a ratio of volume to height of 0.71 m² and a cross-sectional area of 0.71 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 321 kg/h, corresponding to 2850 tonnes per year with an annual output of 8864 hours, with a specific BET surface area of 200 m²/g, with a tapped density after bagging in a 10 kg paper sack of 40 g/l, with a pH of a 4% by weight aqueous dispersion of 4.0, a screen residue according to Mocker larger than 40 μm of 0.005% by weight, a thickening action $\eta/\eta 0$ in a silicone oil of 7.5, a thickening action $\eta/\eta 0$ in an uncrosslinked unsaturated polyester resin of 6.7, a mean sphere-equivalent hydrodynamic particle size of 200 nm after ultrasound dispersion at 0.3% by weight, a temperature of 25° C. and at pH 10, and measured with a Malvern Zetasizer Nano ZS® at a backscatter angle of 173°.

Example 9

A gas mixture which enters a burner chamber via a nozzle at the top of a combustion chamber from a nozzle with a gas velocity of 63 m/s at a dosage rate of 3300 m³ (STP)/h, which contains 14 mol % of tetrachlorosilane, 0.1 mol % of methyl trichlorosilane, 6.4 mol % of hydrogen, 2.1 mol % of carbon dioxide, 17 mol % of oxygen, 69 mol % of nitrogen, 7.2 mol % of hydrogen methyl dichlorosilane, 1.3 mol % of hydrogen trichlorosilane, 2 mol % of tetramethylsilane, 1.4 mol % of trimethyl chlorosilane and 1.1 mol % of alkane (mixture of propanes, butanes and pentanes, propenes, butenes and pentenes, and chloropropanes, chlorobutanes and chloropentanes) as gases, said combustion chamber having a volume of 3.3 m³, and a ratio of volume to height of 0.71 m² and a cross-sectional area of 0.71 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 323 kg/h, corresponding to 2860 tonnes per year with an annual output of 8864 hours, with a specific BET surface area of 200 m²/g, with a tapped density after bagging in a 10 kg paper sack of 40 g/l, with a pH of a 4% by weight aqueous dispersion of 4.0, a screen residue according to Mocker larger than 40 μm of 0.005% by weight, a thickening action $\eta/\eta 0$ in a silicone oil of 7.5, a thickening action $\eta/\eta 0$ in an uncrosslinked unsaturated polyester resin of 6.7, a mean sphere-equivalent hydrodynamic particle size of 200 nm after ultrasound dispersion at 0.3% by weight, a temperature of 25° C. and at pH 10, and measured with a Malvern Zetasizer Nano ZS® at a backscatter angle of 173°.

Example 10

A gas mixture which enters a burner chamber via a nozzle at the top of a combustion chamber from a nozzle with a gas velocity of 51 m/s at a dosage rate of 2450 m³ (STP)/h, which contains 0 mol % of tetrachlorosilane, 5.2 mol % of methyl trichlorosilane, 6.2 mol % of hydrogen, 2.1 mol % of carbon dioxide, 17 mol % of oxygen, 69 mol % of nitrogen, 0 mol % of hydrogen methyl dichlorosilane, 0 mol % of hydrogen trichlorosilane, 0 mol % of tetramethylsilane, 0 mol % of trimethyl chlorosilane and 0 mol % of alkane (mixture of propanes, butanes and pentanes, propenes, butenes and pentenes, and chloropropanes, chlorobutanes and chloropentanes) as gases, said combustion chamber having a volume of 3.3 m³, and a ratio of volume to height of 0.71 m² and a cross-sectional area of 0.71 m², is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 341 kg/h, corresponding to 3020 tonnes per year with an annual output of 8864 hours, with a specific BET surface area of 150 m²/g, with a tapped density after bagging in a 10 kg paper sack of 40 g/l, with a pH of a 4% by weight aqueous dispersion of 4.1, a screen residue according to Mocker larger than 40 μm of 0.005% by weight, a thickening action $\eta/\eta 0$ in a silicone oil of 5.5, a thickening action $\eta/\eta 0$ in an uncrosslinked unsaturated polyester resin of 4.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 11

A gas mixture which enters a burner chamber via a nozzle at the top of a combustion chamber from a nozzle with a gas velocity of 56 m/s at a dosage rate of 2690 m$^3$ (STP)/h, which contains 1.6 mol % of tetrachlorosilane, 0.1 mol % of methyl trichlorosilane, 5.7 mol % of hydrogen, 1.9 mol % of carbon dioxide, 17 mol % of oxygen, 69 mol % of nitrogen, 0.8 mol % of hydrogen methyl dichlorosilane, 0.15 mol % of hydrogen trichlorosilane, 0.24 mol % of tetramethylsilane, 1.6 mol % of trimethyl chlorosilane and 1.3 mol % of alkane (mixture of propanes, butanes and pentanes, propenes, butenes and pentenes, and chloropropanes, chlorobutanes and chloropentanes) as gases, said combustion chamber having a volume of 3.3 m$^3$, and a ratio of volume to height of 0.71 m$^2$ and a cross-sectional area of 0.71 m$^2$, is reacted in the combustion chamber at 1000° C. to 2000° C. After sucking the product out of the combustion chamber, cooling to less than 200° C., removing the hydrogen chloride gas formed from the fumed silica formed by means of mesh filters, recovering dry hydrogen chloride gas in a multistage absorption and desorption process, reducing the excess chlorine gas, and cleaning the offgas, and purifying the fumed silica in a fluidized bed by means of hot gases at 400 to 800° C., a fumed silica is obtained in an amount of 343 kg/h, corresponding to 3040 tonnes per year with an annual output of 8864 hours, with a specific BET surface area of 150 m$^2$/g, with a tapped density after bagging in a 10 kg paper sack of 40 g/l, with a pH of a 4% by weight aqueous dispersion of 4.1, a screen residue according to Mocker larger than 40 μm of 0.005% by weight, a thickening action η/η0 in a silicone oil of 5.5, a thickening action η/η0 in an uncrosslinked unsaturated polyester resin of 4.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 12

100 g of a silica according to example 6 with a BET of 150 are contacted in a glass apparatus under an inert nitrogen atmosphere with a fine aerosol of a liquid while being fluidized with paddle stirrers, in such a way that a total of 100 g of the liquid are applied to the silica and the silica still has the appearance of a dry colloidal powder. Subsequently, the silica thus laden is introduced in a porcelain dish into a drying cabinet of capacity 300 liters with a gas circulation rate of 900 liters per minute and freed of liquid under an inert nitrogen atmosphere and dried to silica content at least >99% by weight. Subsequently, the tapped density is determined to DIN. The tapped densities thus obtained with different liquids are summarized in table 1.

TABLE 1

| Density of the finely divided silica g/l | Liquid | Spec. density of liquid g/l | Dielectric constant | Surface tension mN/m |
|---|---|---|---|---|
| 100 | water | 1.00 | 78.25 | 72.8 |
| 82 | toluene | 0.87 | 2.3 | 29 |
| 76 | c-hexane | 0.78 | 2.02 | 25.3 |
| 72 | MeOH | 0.79 | 32.63 | 22.6 |

TABLE 1-continued

| Density of the finely divided silica g/l | Liquid | Spec. density of liquid g/l | Dielectric constant | Surface tension mN/m |
|---|---|---|---|---|
| 71 | EtOH | 0.79 | 24.3 | 22.5 |
| 67 | iPrOH | 0.79 | 18.3 | 22 |
| 64 | Hexamethyl-disiloxane | 0.76 | 2.17 | 16 |
| 65 | n-hexane | 0.66 | 1.89 | 18.4 |
| 67 | acetone | 0.79 | 21.4 | 23.3 |

Example 13

Silica according to examples 1-11 is incorporated in a room temperature crosslinking black silicone sealant system based on an acetate crosslinker system.

Subsequently, a spatula is used to apply a small amount to a polyethylene film and it is smoothed.

Subsequently, the appearance of the surface is assessed:
very good—no particles,
good—few particles,
satisfactory—some particles,
adequate—several particles,
inadequate—many particles,
unsatisfactory—very many particles on the surface.

The result is summarized in table 2.

| Example | Tapped density | Assessment of appearance |
|---|---|---|
| 1 | 40 | 2 |
| 2 | 40 | 2 |
| 3 | 40 | 2 |
| 4 | 40 | 2 |
| 5 | 40 | 2 |
| 6 | 40 | 2 |
| 10 | 40 | 2 |
| 11 | 40 | 2 |
| 12 | 72 | 3 |

Test Methods:

Specific BET surface area: to DIN 9277/66132 pH: to EN ISO 787/9

Screen residue according to Mocker (greater than 40 μm): to EN ISO 787/18

Tapped density: to EN ISO 787/11

Moisture (weight loss at 2 hours and 105° C.): to EN ISO 787/2

Definition of m$^3$ (STP)/h:

m$^3$ (STP)/h is the volume of gas or steam delivered per 1 hour

Definition of m$^3$ (STP)

The standard cubic meter (abbreviation: m$^3$ (STP)) is a unit used in process technology for the standard volume of a gas.

The definition of the standard cubic meter is laid down in DIN 1343 and in ISO 2533.

A standard cubic meter is the amount which corresponds to one cubic meter of gas at a pressure of 1.01325 bar, an air humidity of 0% (dry gas) and a temperature of 0° C. (DIN 1343) or 15° C. (ISO 2533).

This means that one standard cubic meter of gas has a volume of 1 m$^3$ under the fixed conditions, but generally another volume which can be determined by specific calculations under different conditions.

In the compressed air industry, different values according to DIN 1945 apply. Here, the standard volume is reported for a pressure of 1 bar, a temperature of 20° C. at 0% air humidity.

The invention claimed is:

1. A flame reactor, wherein the flame reactor has a reactor chamber with a volume of 1 $m^3$ to 4 $m^3$, a height of 1 m to 4 m and a reactor nozzle for supply of the reactants.

2. The flame reactor as claimed in claim 1, wherein the reactor chamber has a cross-sectional area of 0.1 $m^2$ to 1 $m^2$.

3. The flame reactor as claimed in claim 1, wherein the flame reactor has a ratio of volume to height of 0.1 $m^2$ to 1 $m^2$.

4. The flame reactor as claimed in claim 1, wherein the reactor chamber has a diameter at the top of 0.1 m to 1.0 m.

5. The flame reactor as claimed in claim 1, wherein the reactor chamber has, at half the length, a diameter at least 10% wider than the diameter of the reactor chamber at the top of the reactor.

6. The flame reactor as claimed in claim 1, wherein the reactor chamber has a circular cross section.

7. The flame reactor as claimed in claim 1, wherein the reactor nozzle is 0.05 m to 0.25 m in diameter.

8. The flame reactor as claimed in claim 1, wherein the exit area of the reactor nozzle is 0.001 $m^2$ to 0.1 $m^2$ in size.

9. The flame reactor as claimed in claim 1, wherein the cross section of the reactor nozzle is circular.

10. The flame reactor as claimed in claim 1, wherein the reactor nozzle in the upright reactor chamber is arranged at the top and the reactor nozzle is directed downward.

\* \* \* \* \*